US009035514B2

(12) United States Patent
Baudelocque

(10) Patent No.: US 9,035,514 B2
(45) Date of Patent: May 19, 2015

(54) JACKETED ELECTROMAGNETIC MACHINE STATOR FOR USE IN A CORROSIVE ATMOSPHERE WITHOUT HEAT TREATMENT

(71) Applicant: SKF MAGNETIC MECHATRONICS, Saint Marcel (FR)

(72) Inventor: Luc Baudelocque, Vernon (FR)

(73) Assignee: SKF MAGNETIC MECHATRONICS, Saint Marcel (FR)

( * ) Notice: Subject to any disclaimer, the term of this patent is extended or adjusted under 35 U.S.C. 154(b) by 232 days.

(21) Appl. No.: 13/654,989

(22) Filed: Oct. 18, 2012

(65) Prior Publication Data
US 2013/0099612 A1 Apr. 25, 2013

(30) Foreign Application Priority Data

Oct. 20, 2011 (FR) ...................................... 11 59484

(51) Int. Cl.
*H02K 5/128* (2006.01)
*F16C 32/04* (2006.01)
*H02K 7/09* (2006.01)

(52) U.S. Cl.
CPC .............. *F16C 32/047* (2013.01); *H02K 5/128* (2013.01); *H02K 7/09* (2013.01); *F16C 2300/42* (2013.01)

(58) Field of Classification Search
None
See application file for complete search history.

(56) References Cited

U.S. PATENT DOCUMENTS

| 3,560,776 | A | * | 2/1971 | Kildishev et al. | 310/214 |
| 5,698,917 | A | * | 12/1997 | Shultz | 310/87 |
| 7,847,454 | B2 | | 12/2010 | Weeber et al. | |
| 2002/0047399 | A1 | * | 4/2002 | Shinozaki | 310/90.5 |
| 2007/0200443 | A1 | * | 8/2007 | Baudelocque et al. | 310/90.5 |
| 2007/0278879 | A1 | * | 12/2007 | Kaminski et al. | 310/86 |
| 2009/0309431 | A1 | * | 12/2009 | Kaminski et al. | 310/52 |
| 2010/0187926 | A1 | | 7/2010 | Baudelocque et al. | |

FOREIGN PATENT DOCUMENTS

| EP | 1 113 182 | 7/2001 |
| EP | 1 863 152 | 12/2007 |
| FR | 2 938 028 | 5/2010 |

* cited by examiner

*Primary Examiner* — Tran Nguyen
(74) *Attorney, Agent, or Firm* — Hamre, Schumann, Mueller & Larson, P.C.

(57) ABSTRACT

A jacketed electromagnetic machine stator for a pressurized rotary machine operating in a corrosive atmosphere containing $H_2S$ or wet $CO_2$ and including a plurality of pole pieces separated from a rotor by an airgap, wherein the hermetically sealed enclosure protecting said stator from said corrosive atmosphere includes a jacket constituted by a non-magnetic cylinder having magnetic material inlays situated in register with said pole pieces and that are not in contact with said corrosive atmosphere, said hermetically sealed enclosure being constituted externally solely by parts made of non-magnetic material that are secured to one another by welds that have not been subjected to any heat treatment.

11 Claims, 3 Drawing Sheets

JACKETED ELECTROMAGNETIC MACHINE STATOR FOR USE IN A CORROSIVE ATMOSPHERE WITHOUT HEAT TREATMENT

FIELD OF THE INVENTION

The present invention relates to a jacketed electromagnetic machine stator for a rotary machine placed in contact with a process gas containing $H_2S$ or wet $CO_2$.

BACKGROUND OF THE INVENTION

Applications of magnetic bearings in rotary machines have developed considerably in the last few years because of the enormous advantage obtained by operating them directly in the process gas of the machine in question, without sealing. Thus, and in non-limiting manner, magnetic bearings are to be found on turbo-expanders, on refrigeration compressors, on electric motors for driving compressors, etc.

In ordinary applications, magnetic circuits are all based on silicon iron. The ferromagnetic sheets forming the laminated magnetic material of such circuits thus have the advantage of presenting magnetic characteristics that are well defined and guaranteed by their suppliers, in particular a hysteresis cycle that is limited and magnetic permeability and saturation induction that are high.

Nevertheless, for more particular applications, in a medium that is acid, corrosive, or carrying particles, direct contact between ferromagnetic laminations as used in windings and process gases is found to be impossible without installing jackets that isolate the magnetic circuits of the stator from the aggressive environment, and thus enable conventional materials based on silicon iron to be used for those circuits.

Furthermore, such a jacket conventionally needs to have a coefficient of thermal expansion that is identical to that of the ferromagnetic laminations supporting the winding so that it does not deform as a function of temperature, which would quickly lead to the stator being destroyed by coming into contact with the rotor.

Thus, a jacketed magnetic bearing is commonly made up of an assembly of wound ferromagnetic laminations inserted in an enclosure that is hermetically sealed against the environment in which it is used in order to protect it from the corrosive attacks by said environment. Each of the components of the enclosure, and also the connections between them, must be capable of withstanding the corrosion that can be caused by that environment. Furthermore, in so-called "oil and gas" environments, with more specific applications coming under the standard ANSI/NACE MR0175/ISO 15156 "Petroleum and natural gas industries—Materials for use in $H_2S$-containing environments in oil and gas production", hardness constraints put a limit on the materials that can be selected.

Conventionally, the magnetic material generally used for the jacket is a martensitic stainless steel with precipitation hardening. Unfortunately, in order to comply with the recommendations of the above-mentioned standard, welding such a material requires heat treatment (typically high temperature annealing performed at about 620° C.), which is incompatible with a jacket that is fine or with the high-temperature capacity of the wound ferromagnetic laminations themselves, which conventionally cannot withstand temperatures higher than 250° C. Without such heat treatment, welds lose their anti-corrosion compatibility, thereby greatly complicating fabrication of the bearing and very significantly increasing the costs of using it.

In order to recover such compatibility, U.S. Pat. No. 7,847,454 proposes using a bearing jacket made of two materials that is subjected to heat treatment before final machining, with only a central portion thereof being made of martensitic stainless steel with precipitation hardening, the remaining portions of the jacket being made of a non-magnetic material such that during final assembly operations, the only welds that remain to be made are all welds that are compatible with the standard NACE MR0175/ISO 15156, such as welds between non-magnetic materials. Likewise, it is necessary to add numerous inserts of non-magnetic material on other portions of the support, with those parts being welded to the magnetic portions, and with the welds being subjected to heat treatment, and then being re-machined in order to give them their final shapes prior to final assembly.

FIG. 3 shows an example of an active magnetic bearing stator arranged in a hermetically sealed jacket, as described in the above-mentioned patent. The enclosure is commonly constituted by a cylindrical support 10 having a longitudinal axis 12 with a set of wound ferromagnetic laminations 14 interference fitted therein. The support is provided with walls 16, 18 on each of its side faces, and the enclosure is finished off by adding a cylindrical jacket 20 on its inside diameter in contact with the process gas. The enclosure is completely filled with a potting resin 22 thereby reinforcing its mechanical strength so that it can be placed in pressurized surroundings (up to a few hundreds of bars). The windings (electromagnet coils) of the bearing stator are connected through a conventional hermetically sealed socket (not shown) to electronic control circuits 24 that, as shown, may be located outside the hermetic enclosure as created in this way.

The jacket 20 is constituted by a cylindrical central portion 20A made of a magnetic material, typically a martensitic stainless steel with precipitation hardening of the 17-4 PH type, having extensions 20B fitted at both ends that are made of a non-magnetic material, typically of Inconel. The walls 16, 18 are also made in two portions with inserts 16A, 18A previously welded to the bearing support 10, heat-treated, and then re-machined to their final dimensions, and cheek-plates 16B, 18B making the connections between these inserts and the jacket 20, and more precisely its extensions 20B. These inserts and cheek-plates are made of a non-magnetic material, typically likewise of Inconel. The support 10 of the bearing is conventionally made of 17-4 PH in order to have a coefficient of thermal expansion that is practically identical to that of the wound assembly 14 based on silicon iron, as is necessary to guarantee that the ferromagnetic laminations remain an interference fit within the support up to high ambient temperatures (typically up to 200° C.)

This stator is assembled as follows. The extensions 20B are initially welded to the central portion 20A in order to form the jacket 20, and then the assembly is heat-treated at around 620° C., and is finally reworked by machining in order to mitigate the deformations created by the treatment at high temperature. Likewise, the side inserts 16A, 18A are welded to the bearing support 10, and then the assembly is also subjected to heat treatment at about 620° C. Naturally the heat treatments have the effect of producing geometrical deformations that are subsequently reworked by machining. The wound ferromagnetic laminations of the bearing 14 can then be inserted as an interference fit inside the support 10, after which the cheek-plates 16B, 18B are welded to the inserts 16A, 18A, and the jacket 20 is welded to the cheek-plates, with none of these welds requiring subsequent heat treatment.

Thus, by providing the jacket and also the support with non-magnetic inserts, it becomes possible, once these inserts have been welded both to the jacket and to the support, and once the assembly has been subjected to high-temperature annealing, to place the wound ferromagnetic laminations inside the enclosure and then to weld the non-magnetic inserts together, without having recourse to any particular heat treatment, and taking action at temperatures that are compatible with the materials of the laminations and of the windings.

Unfortunately, the initial heat treatment operations, and the necessary reworking are lengthy and complex, and therefore particularly expensive. They are also sources of major fabrication anomalies, in particular in the two-material bearing jacket, which is particularly difficult to connect with the inserts because of its very small thickness.

OBJECT AND DEFINITION OF THE INVENTION

An object of the present invention is to remedy the above-mentioned drawbacks by proposing a jacketed electromagnetic machine stator that is suitable in particular for operating in a pressurized environment containing $H_2S$ and wet $CO_2$, while avoiding any need for subjecting the welds to additional heat treatment and numerous reworking operations. Another object of the invention is also to avoid any need to have a bearing support with a coefficient of thermal expansion that is identical to that of the ferromagnetic laminations ought to be capable of making the bearing support out of expensive materials (such as Inconel) at thickness that is very small and thus at minimum cost.

These objects are achieved by a jacketed electromagnetic machine stator for a pressurized rotary machine operating in a corrosive atmosphere containing $H_2S$ or wet $CO_2$ and including a plurality of pole pieces separated from a rotor by an airgap, wherein the hermetically sealed enclosure protecting said stator from said corrosive atmosphere includes a jacket constituted by a non-magnetic cylinder having magnetic material inlays situated in register with said pole pieces and that are not in contact with said corrosive atmosphere, said hermetically sealed enclosure being constituted externally solely by parts made of non-magnetic material that are secured to one another by welds that have not been subjected to any heat treatment.

By eliminating any heat treatment of the welds, the resulting re-working is eliminated, and the costs of fabricating the stator are correspondingly reduced while also limiting the risks of defective work.

Preferably, said non-magnetic inlays are advantageously made of a material that is electrically non-conductive.

Said magnetic material inlays may also themselves form a magnetic cylinder and they may preferably be electrically insulated from one another.

Depending on the intended embodiment, said magnetic material inlays may be welded or adhesively bonded to said non-magnetic cylinder, and said magnetic cylinder may then advantageously be an interference fit on said non-magnetic cylinder.

Depending on the intended embodiment, in order to form said hermetic enclosure, the stator may also include side walls of non-magnetic material welded to said jacket, and a yoke of non-magnetic material welded to said side walls and an interference fit in a stator support of magnetic material capable of containing the radial thermal expansion of said a hermetic enclosure, or indeed it may include side walls of non-magnetic material welded to said jacket and fastened without welding by fastener means to a stator support of magnetic material, hermetic sealing between said side walls and said stator support being obtained by one or more metal or polymer gaskets of the O-ring type.

BRIEF DESCRIPTION OF THE DRAWINGS

The characteristics and advantages of the present invention appear more clearly from the following description made by way of non-limiting indication, and with reference to the accompanying drawings, in which.

DETAILED DESCRIPTION OF A PREFERRED EMBODIMENT

Figure 1:
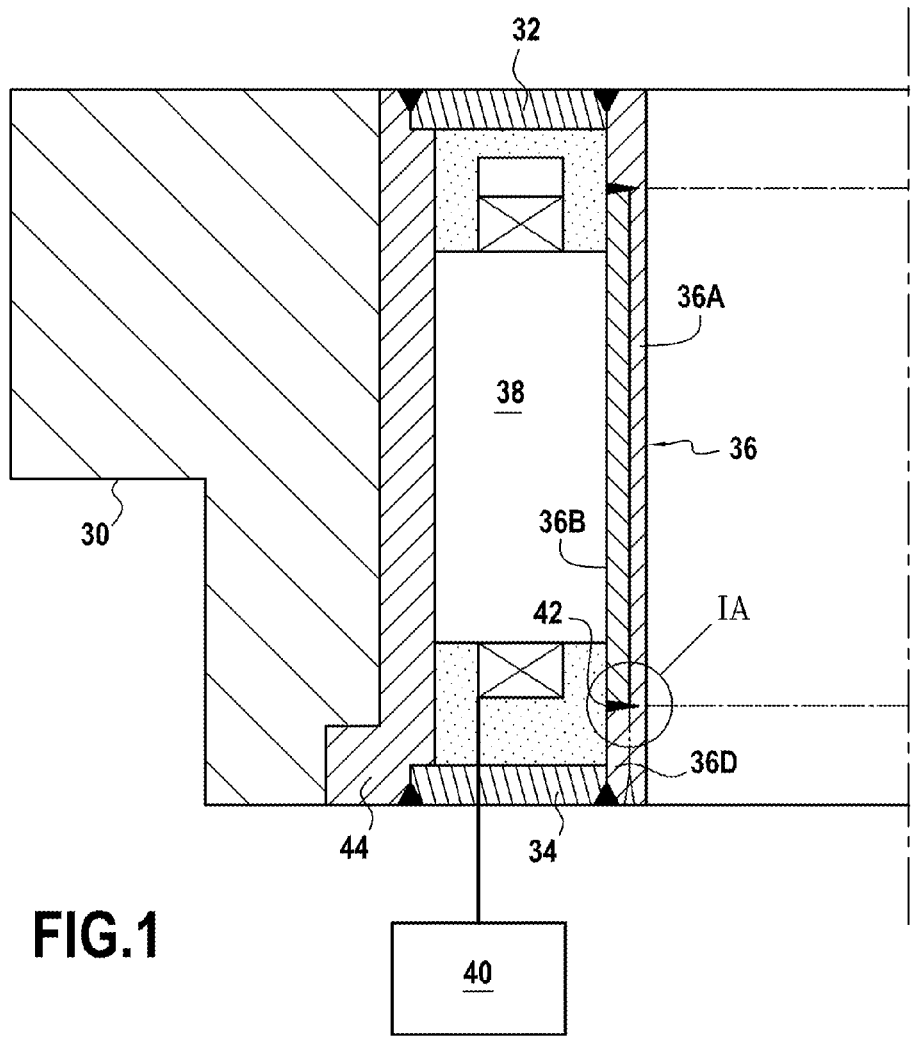
FIG. 1 is a diagrammatic view of a first embodiment of an active magnetic bearing stator of the invention for operating in a corrosive atmosphere.

FIG. 1 shows a first embodiment of a jacketed stator for an electromagnetic machine, and more precisely a jacketed active magnetic bearing stator of the invention for operating in an atmosphere in compliance with the standard NACE MR0175/ISO 15156. There can naturally be found the usual components of a jacketed active magnetic bearing, namely the bearing support 30 with its side walls 32, 34 and the protective jacket 36 for protecting the magnetic circuits 38, which circuits are connected to control circuits 40. It should be observed that although the bearing shown is a radial bearing, it is clear that the invention applies in like manner to a bearing that is axial or both radial and axial.

Nevertheless, unlike the prior art bearing stator structure, the cylindrical jacket 36 in register with the magnetic airgap is constituted exclusively on the outside surface of the stator by a non-magnetic material such as Inconel, and therefore does not leave visible on the outside any magnetic portion in contact with the process gas that might contain $H_2S$ or wet $CO_2$. All the other portions of the stator in contact with the process gas are also constituted by non-magnetic materials of Inconel type or non-magnetic stainless steel (e.g. of 316L, 304L, or 904L type), the bearing support 30 naturally continuing to be made conventionally out of magnetic stainless steel of 17-4 PH type or of material having a coefficient of thermal expansion close to that of the ferromagnetic laminations forming the pole pieces 38.

Welding these materials together thus does not create a zone of hardness greater than the recommendations of the standard NACE MR0175/ISO 15156, and as a result remains fully compatible with exposure to $H_2S$ or to wet $CO_2$.

More particularly, the jacket 36 is constituted by a first cylinder 36A of non-magnetic material of the Inconel type having inlaid therein a second cylinder 36B of a magnetic material, typically a 17-4 PH magnetic stainless steel or any other magnetic steel having the same coefficient of thermal expansion. This inlaying operation is performed on the surface of the first cylinder that does not come into contact with the process gas that might contain $H_2S$ or wet $CO_2$. In addition, this inlaying has the consequence of making the magnetic airgap smaller. If the jacket has a typical thickness of 0.5 millimeters (mm), and if the magnetic insert has a typical thickness of 0.4 mm, then since the mechanical airgap is typically 0.8 mm, the magnetic airgap is only 0.9 mm instead of 1.3 mm for a non-magnetic jacket that does not have such a magnetic cylinder inlaid therein.

In order to enable the second cylinder to be inlaid in the first, the second cylinder is advantageously made up of a plurality of optionally-adjacent portions.

Figure 1A:
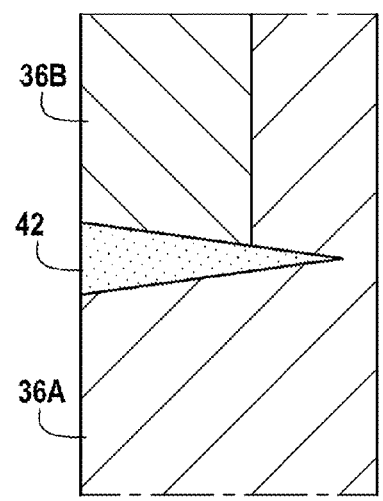
FIG. 1A shows an embodiment detail of a magnetic inlay welded in the protective jacket of the FIG. 1 bearing stator.
Figure 1B:
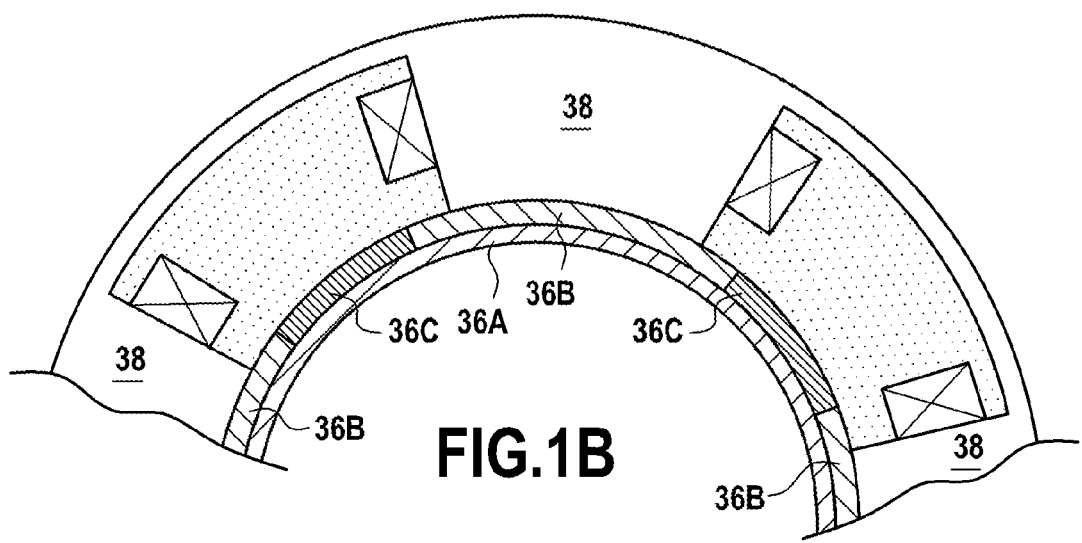
FIG. 1B is a fragmentary section showing the structure of the protective jacket of the FIG. 1 bearing stator.

Furthermore, as can be seen in the detail view of FIG. 1B, the portions 36C situated between the poles of the bearing are preferably not magnetic (and made of a material that is electrically conductive, or advantageously nonconductive, in order to improve both the pass band and also losses by reducing the eddy currents flowing in the jacket) while the portions 36B in register with the poles are magnetic. This serves to avoid reluctance short-circuiting at the poles, as exists in the prior art, while also increasing the pass band and the loading capacity of the bearing. These various portions of the second cylinder may optionally be electrically insulated from one another (e.g. by adhesive or varnish) and they are secured to the first cylinder by welding or by adhesive. When the second cylinder 36B, 36C is made as a single piece, it is advantageously an interference fit with the first cylinder 36A, with this form of assembly being made possible by the presence of a closure bushing 36D of non-magnetic material welded or adhesively bonded to the first cylinder 36A (see FIG. 1).

As shown in the enlargement of FIG. 1A, it should be observed that when making a connection by welding 42, there is no longer any need for heat treatment since such two-material welds that are the subject of hardening are never exposed to the process gas containing $H_2S$ or wet $CO_2$. If it becomes necessary to adjust the inside diameter that is exposed to the ambient gas, then it is only the Inconel-on-Inconel weld portion that can be exposed to process gas and there is then still no need to have recourse to heat treatment.

As can be seen in FIG. 1, in order to ensure that the outer portions of the enclosure hermetically enclosing the magnetic circuits 38 of the bearing are made of non-magnetic portions only, and thus present the advantage of being capable of being welded together without requiring heat treatment and without requiring machining for re-working, while still remaining in compliance with the recommendations of the standard NACE MR0175/ISO 15156, the side walls 32 and 34 are not welded directly to the support 30, but rather to an outer wall or yoke 44 of non-magnetic material that is an interference fit with the support (being put into place before or after assembly). Thus, the yoke is an interference fit between two materials, that of the support and that of the ferromagnetic laminations, having coefficients of thermal expansion that are very close to each other and therefore conserves the interference fit of the magnetic laminations independently of thermal expansion due to variations in temperature (therefore without risk of the magnetic core no longer being held by the interference fit).

The yoke 44 may be constituted merely as an Inconel cylinder (preferably made of Inconel sheet that is rolled up and welded axially for reasons of cost) in order to be completely unaffected both by radial and by longitudinal expansion that might otherwise stress and weaken the welds.

The jacket 36 in register with the magnetic airgap reveals only a non-magnetic material such as Inconel. It is welded to the walls 32 and 34 of the enclosure by (electron beam (EB), laser, tungsten inert gas (TIG), etc.) welding without any need for heat treatment. The walls 32 and 34 of the enclosure may be made either of 316 L non-magnetic stainless steel or the like, or else likewise out of Inconel, and they may be welded to the yoke 44 in the same manner, likewise without heat treatment.

Figure 3:
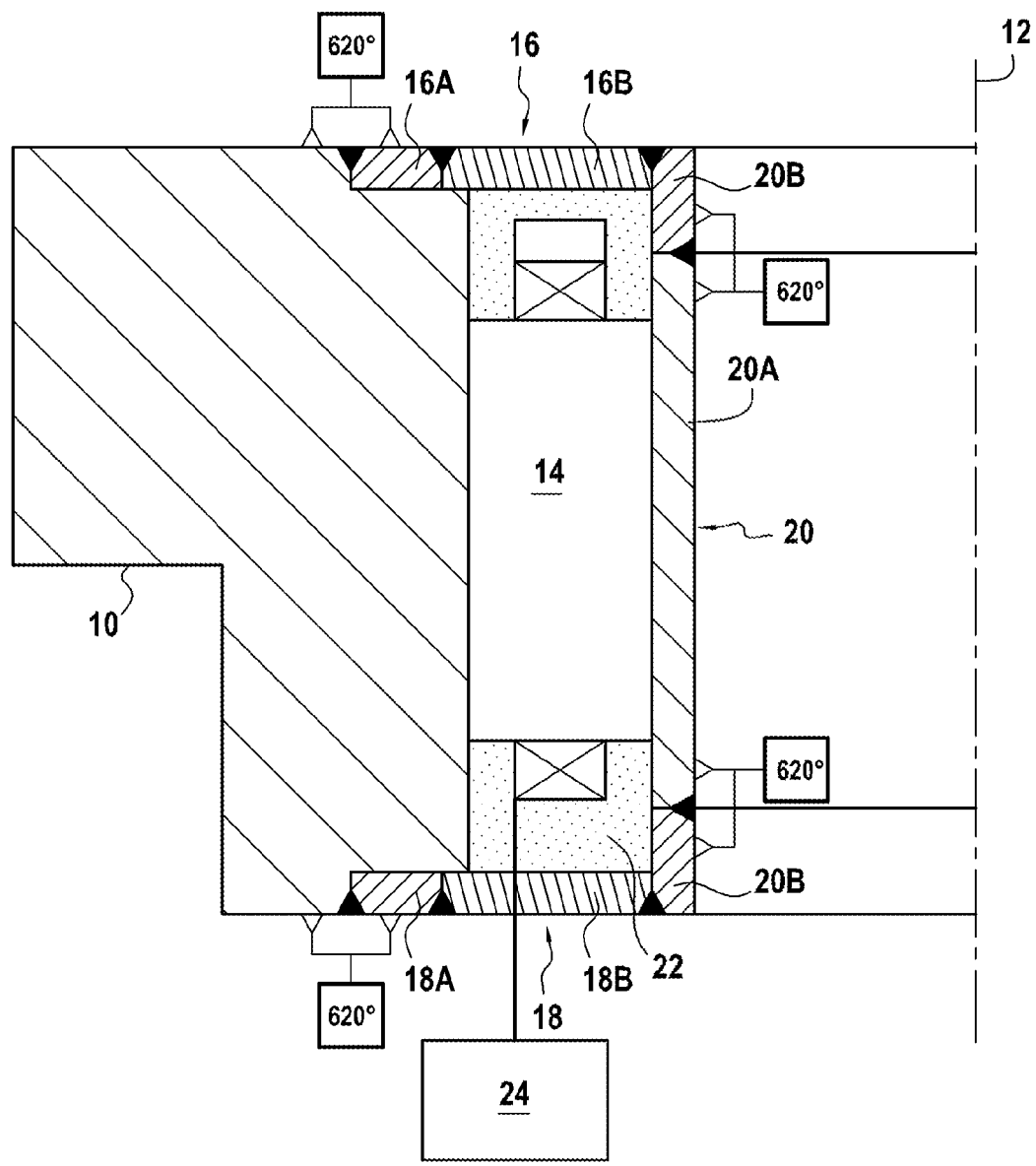
FIG. 3 is a diagrammatic view of an embodiment of an active magnetic bearing stator of the prior art for operating in a corrosive atmosphere.

The assembly as made in this way is then interference fitted without welding in the support 30 of 17-4 PH or of a material having a coefficient of thermal expansion that is close to that of the ferromagnetic laminations. Thus, in comparison with the prior art shown in FIG. 3, the number of welds is reduced, consequently reducing any risk of leakage, as are the time required for fabrication and the cost of the bearing, while also considerably increasing its reliability.

Figure 2:
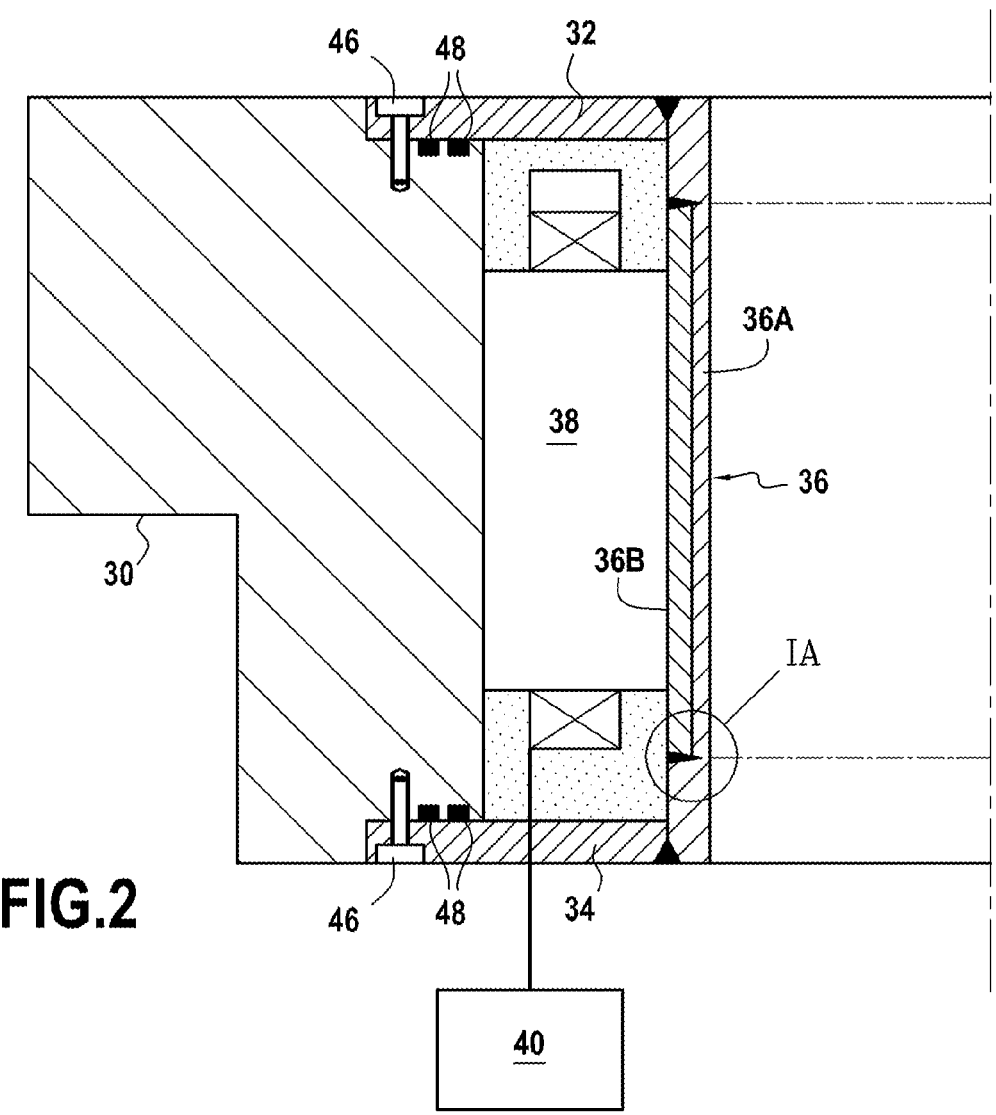
FIG. 2 is a diagrammatic view of a second embodiment of an active magnetic bearing stator of the invention for operating in a corrosive atmosphere.

FIG. 2 shows another embodiment in which the side walls 32 and 34 are no longer welded to the yoke 44 but are fastened to the support 30 by fastener means 46, e.g. screws, with the enclosure being sealed hermetically by metal or polymer O-ring gaskets 48 mounted in appropriate circular grooves in the support.

What is claimed is:

1. A jacketed electromagnetic machine stator for a pressurized rotary machine operating in a corrosive atmosphere containing $H_2S$ or wet $CO_2$, comprising:
   a plurality of pole pieces configured to be separated from a rotor by an airgap; and
   a hermetically sealed enclosure for protecting said stator from said corrosive atmosphere, including a jacket, wherein the jacket includes a non-magnetic cylinder, and magnetic material inlays situated in alignment with said plurality of pole pieces so that the plurality of pole pieces are not in contact with said corrosive atmosphere, said hermetically sealed enclosure having external parts made of non-magnetic material that are secured together by welds that have not been subjected to any heat treatment.

2. The jacketed electromagnetic machine stator according to claim 1, wherein said non-magnetic cylinder includes non-magnetic inlays between said pole pieces.

3. The jacketed electromagnetic machine stator according to claim 2, wherein said non-magnetic inlays are made of electrically non-conductive material.

4. The jacketed electromagnetic machine stator according to claim 1, wherein, in order to form said hermetically sealed enclosure, the stator also includes side walls of non-magnetic materials welded to said jacket, and a yoke of non-magnetic material welded to said side walls and an interference fit in a stator support capable of containing the radial thermal expansion of said hermetically sealed enclosure.

5. The jacketed electromagnetic machine stator according to claim 1, wherein, in order to form said hermetically sealed enclosure, the stator further includes side walls of non-magnetic materials welded to said jacket and fastened without welding by fastener means to a stator support, hermetic sealing between said side walls and said stator support being obtained by one or more O-ring type metal or polymer gaskets.

6. The jacketed electromagnetic machine stator according to claim 1, wherein said inlays of magnetic material are welded to said non-magnetic cylinder.

7. The jacketed cylinder of an electromagnetic machine according to claim 1, wherein said inlays of non-magnetic material are adhesively bonded to said non-magnetic cylinder.

8. A method, comprising using the jacketed electromagnetic machine stator according to claim 1 in a jacketed active magnetic bearing or in a jacketed electric motor for a pressurized rotary machine.

9. The method according to claim 8, comprising using the jacketed active magnetic bearing in a turbo-expander.

10. The method according to claim 8, comprising using the jacketed active magnetic bearing in a compressor.

11. The method according to claim 8, comprising using the jacketed active magnetic bearing in an electric motor.

* * * * *